United States Patent Office 3,388,931
Patented June 18, 1968

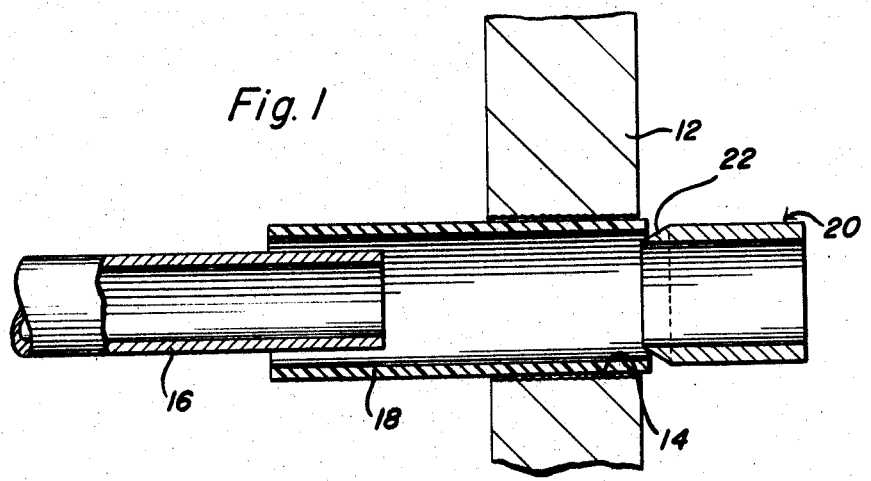
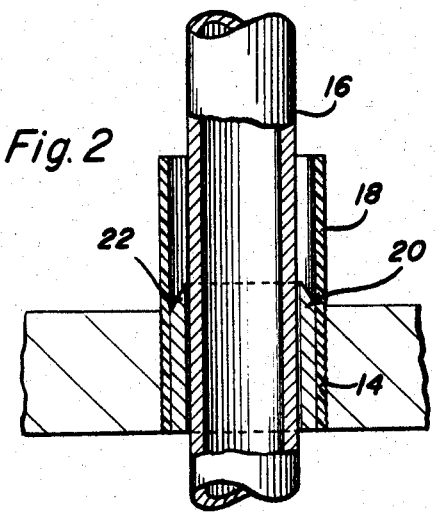
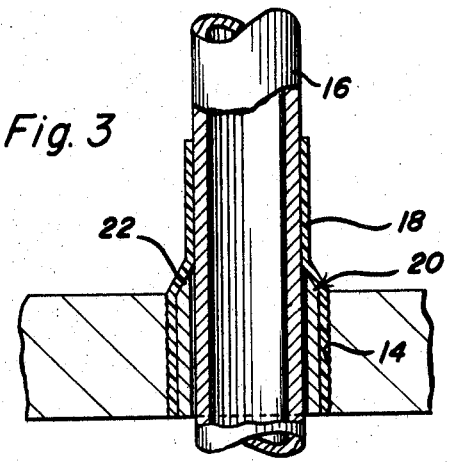
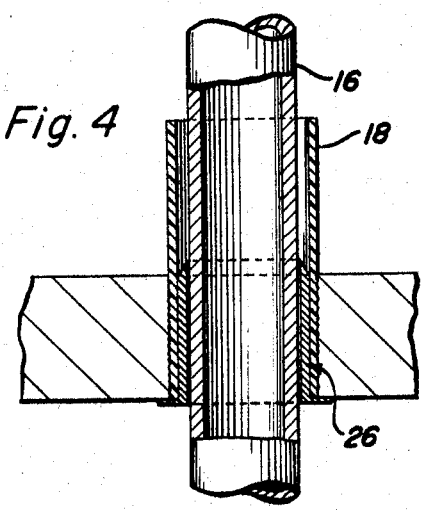
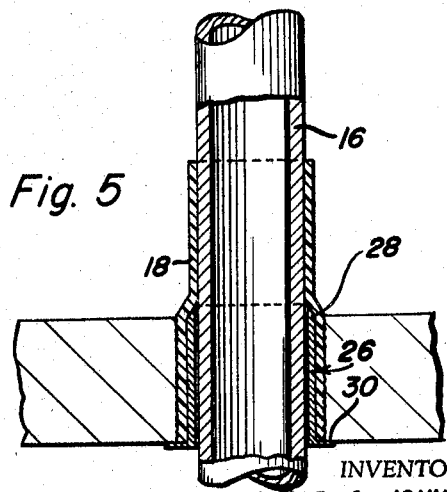

3,388,931
TUBE PLATE SEAL
Richard C. Johnson, Dansville, N.Y., and Milton Jerome Kraje, Livingston, N.J., assignors to Foster Wheeler Corporation, Livingston, N.J., a corporation of New York
Filed Mar. 31, 1967, Ser. No. 627,528
7 Claims. (Cl. 285—159)

ABSTRACT OF THE DISCLOSURE

A tube to plate seal including two members between the tube and tube plate, one being a heat-shrinkable cylindrical plastic insert within the plate opening, the other a cylindrical ferrule within the insert pressing the latter against the plate. The plastic insert has a longitudinal dimension in excess of that of the ferrule sufficient so that, on the application of heat, the insert shrinks into sealing engagement with the tube extending through the plate opening.

---

The present invention relates to improvements in a tube to plate seal, and in particular, a tube to plate seal suitable for condensing and flash evaporating units wherein tube plates divide the units into multi-pressure chambers or different pressure zones.

The multi-pressure chambers in such units are divided usually by division or support plates and condensing tubes for the units usually extend from chamber to chamber through the plates. There are numerous prevailing practices for the reduction of leakage and loss of pressure between the different pressure zones which leakage is usually in the clearance between the condensing tubes and division plates. One such practice is the installation of thermoplastic sleeves between the tubes and the inside surfaces of the holes in the plate. In some instances a thick division plate is used with close-hole tolerances. Also used are permeable fiber inserts which swell to a tight closure when wet, neoprene "O" rings, or elastomeric gaskets or sealants which are contiguous with one side of the support plate. All of these sealing methods have shortcomings in that they preclude either easy insertion of the tube bundles, or easy removal of the same for tube replacement.

In accordance with the invention, these shortcomings are overcome by disposing within each tube plate hole a cylindrical heat-shrinkable plastic insert, the insert preferably having a longitudinal dimension so that a portion of the insert is concentric with and coextensive with the plate hole, with a portion protruding free of the plate hole. The plate hole inside diameter is greater than that of the tube outside diameter, and a steel or plastic ferrule is disposed within the plastic insert coextensive with the plate hole and having an inside diameter also in excess of the outside diameter of the metal tube, the outside diameter of the ferrule being that required to press fit the insert against the inside wall of the plate hole. Following insertion of a metal tube within the plate hole, the free end of the plastic insert is subjected to heat to shrink the latter into sealing engagement with the outside surface of the tube.

The invention and advantages thereof will become apparent upon further consideration of the specification with reference to the accompanying drawings, in which FIGURE 1 is an exploded section view showing the components of the seal in accordance with the invention;

FIGURES 2 and 3 are section views illustrating the invention and manner in which the seal in accordance with the invention is obtained; and FIGURES 4 and 5 illustrate an embodiment of the invention.

Referring to the figures, a tube plate 12 is provided with at least one opening or hole 14 through which a tube 16 extends. The plate 12 may be disposed within a condenser having different pressure chambers on opposite sides of the plate, or may be the type of plate used within a flash evaporator also having different pressure chambers on opposite sides of the plate.

Within the hole 14, there is disposed a heat shrinkable plastic insert 18 having a portion coextensive with the thickness of the plate, and a second portion extending or protruding from the hole. Preferably, the length of the insert is equal to about twice the thickness of the plate. Suitable heat-shrinkable plastic materials are polyvinyl chloride and polytetrafluoroethylene. The inserts may have a wall thickness of about .010 inch, depending, however, upon the uses for them and such conditions as temperatures and differential pressures to which the inserts are subjected. The hole 14 is provided with an inside diameter well in excess of the outside diameter of the tube, in the order of about one-sixteenth inch oversize so that there is adequate clearance between the tube and inside wall of the insert 18. The outside diameter of the insert should be close to the inside diameter of the hole 14, but slightly less to facilitate insertion of the inserts within the tube plate holes.

A plastic or steel ferrule 20, having an inside diameter also in excess of the tubing outside diameter, about 1/32 inch oversize, is pressed within the insert, until it is substantially coextensive with the tube hole. The ferrule has an outside diameter which is sufficient to force the insert outwardly into sealing engagement with the inside surface of the plate hole 14. As is shown, the ferrule 20 may have a tapered forward end 22 to permit easy insertion within the insert 18.

In the embodiment of FIGS. 4 and 5, the ferrule 26 may have a flanged portion 30, opposite the forward end 28, engaging one surface of the tube plate thereby accurately locating the ferrule within the tube plate so that a maximum engagement of the insert 18 with the wall of the tube plate hole is obtained.

Following assembly of the insert and ferrule within the plate hole, the tube for that hole is passed through the hole, this being easily done in view of the adequate clearance between the ferrule inside surface and tube outside surface. The inside forward surface of the ferrule may also be tapered outwardly to facilitate insertion of the tube. When the tube is in place, the plastic insert is subjected to heat, in the order of about 200° F., which allows the free end of the insert to shrink into sealing engagement with the tube, as shown in FIGS. 3 and 5. This may be accomplished during what is called the acid cleaning stage of assembly of the unit involved, at which time the 200° temperature is readily obtained.

It should be noted that the tapered ends (22 and 28, FIGS. 3 and 5) of the ferrules, in addition to facilitating assembly, also provide a smooth contoured surface for the plastic insert.

The advantages of the invention should now be apparent. In particular, there is provided a means by which tubes can be readily and easily inserted within a tube plate during assembly, following which effective sealing can be easily and inexpensively achieved. Also, the invention avoids the need for deburring and/or chamfering of a tube plate, and if a chamfer is required, this can be more inexpensively made on the ferrule insert.

An additional advantage is that the sealing action takes place without the requirement of mechanical devices, and the labor costs which would be involved in mechanically sealing thousands of tube plate holes. Also, the loose hole tolerance in the ferrule reduces the possibility of tube restriction or "hang-up" during service, as well as allowing easy reinsertion of metal tubing during repairs. Also, the smooth walls of the plastic insert allow easy removal of the tubes for replacement.

A very important advantage is that the pressure of the ferrule against the insert (as in FIG. 3) prevents the occurrences of spaces where contaminants can seat and corrode the tube plate.

Although the invention has been described with respect to specific embodiments, other advantages and variations within the scope of the following claims will be apparent to those skilled in the art.

What is claimed is:

1. A tube to plate seal wherein the plate is provided with holes through which the tubes extend comprising
    a heat-shrinkable cylindrical plastic insert concentrically disposed within the plate hole, the insert having an outside diameter approximately equal to the plate hole inside diameter;
    a cylindrical ferrule within the insert having an outside diameter slightly in excess of the insert inside diameter positioned so as to provide a press fit of the insert against the inside wall of the plate hole;
    the insert having a longitudinal dimension in excess of that of the ferrule sufficient so that on the application of heat the insert shrinks into sealing engagement with the tube extending through said hole.

2. A tube to plate seal wherein the plate is provided with holes through which the tubes extend comprising
    a heat shrinkable cylindrical plastic insert within the plate hole, the insert having a longitudinal dimension in excess of the plate thickness so that at least one end of the insert protrudes from the plate hole, and an outside diameter approximately equal to the plate hole inside diameter;
    a cylindrical ferrule within the plastic insert having an outside diameter in excess of the plastic insert inside diameter to provide a press fit of the plastic insert within the plate hole, and a longitudinal dimension approximately equal to the plate thickness;
    the ferrule having an inside diameter slightly in excess of the tube outside diameter for easy insertion of the latter within the ferrule;
    the plastic being shrinkable to the tube outside diameter to contact the tube outside surface in sealing engagement therewith on the application of heat.

3. A seal according to claim 2 wherein the ferrule is provided with a tapered end for easy insertion within the plastic insert.

4. A seal according to claim 3 wherein said ferrule is provided with a flanged surface engaging a surface of the tube plate.

5. A seal according to claim 2 wherein the longitudinal dimension of the plastic insert is approximately twice the thickness of the tube plate.

6. A method of obtaining a tube to tube plate seal wherein tubes are disposed within tube plate holes, comprising the steps of
    inserting a heat-shrinkable cylindrical plastic insert within the plate hole, the insert having an outside diameter approximately equal to the plate hole inside diameter;
    inserting a cylindrical ferrule having an outside diameter slightly in excess of the cylindrical plastic insert inside diameter within the insert to create a press fit of the insert against the inside wall of the plate hole;
    inserting a tube within the ferrule and plastic insert;
    subjecting the insert to heat sufficient to cause the insert to shrink into sealing engagement with the outside surface of the tube.

7. A method of obtaining a tube to tube plate seal wherein tubes are disposed within tube plate holes, comprising the steps of
    inserting a heat-shrinkable cylindrical plastic insert within a plate hole, the insert having a longitudinal dimension in excess of the plate thickness so that at least one end of the insert protrudes from the plate hole, and an outside diameter approximately equal to the plate hole inside diameter;
    inserting a cylindrical ferrule having a longitudinal dimension approximately equal to the plate thickness and an outside dimension slightly in excess of the cylindrical plastic insert inside diameter within the insert to provide a press fit of the insert against the inside wall of the plate hole;
    inserting the tube within the ferrule and plastic insert;
    subjecting the insert to heat sufficient to cause the insert to shrink into contact and sealing engagement with the outside surface of the tube.

References Cited

UNITED STATES PATENTS

| | | | |
|---|---|---|---|
| 1,735,563 | 11/1929 | Deckard | 285—381 |
| 2,447,259 | 8/1948 | Lucke | 285—158 |
| 2,938,238 | 5/1960 | Gewecke et al. | 264—230 |

FOREIGN PATENTS

| | | |
|---|---|---|
| 978,098 | 12/1964 | Great Britain. |
| 1,159,921 | 2/1958 | France. |
| 1,172,418 | 6/1964 | Germany. |

EDWARD C. ALLEN, *Primary Examiner.*

W. L. SHEDD, *Assistant Examiner.*